(12) United States Patent
Langlois

(10) Patent No.: US 6,217,107 B1
(45) Date of Patent: Apr. 17, 2001

(54) TWO-PIECE NESTABLE AIRFAIRING

(75) Inventor: Richard Langlois, Oakville (CA)

(73) Assignee: Laydon Composites Ltd., Oakville (CA)

( * ) Notice: Subject to any disclaimer, the term of this patent is extended or adjusted under 35 U.S.C. 154(b) by 0 days.

(21) Appl. No.: 09/291,073

(22) Filed: Apr. 14, 1999

(30) Foreign Application Priority Data

Apr. 15, 1998 (CA) .................................................. 2234783

(51) Int. Cl.[7] .................................................. B62D 35/00
(52) U.S. Cl. .................................................. 296/180.2
(58) Field of Search ............................ 296/180.1, 180.2, 296/180.3, 180.4, 180.5

(56) References Cited

U.S. PATENT DOCUMENTS

| | | | | |
|---|---|---|---|---|
| 5,249,837 | * | 10/1993 | Luttrell | 296/180.3 |
| 5,603,549 | * | 2/1997 | Chen et al. | 296/180.1 |
| 5,658,039 | * | 8/1997 | Bennett | 296/180.5 |

* cited by examiner

Primary Examiner—D. Glenn Dayoan
Assistant Examiner—Patricia Engle
(74) Attorney, Agent, or Firm—Friedrich Kueffner

(57) ABSTRACT

A simplified two-piece airfairing which is nestable when not in the operative position, as for example during shipping. To change from the nested to the operative position only requires manipulation of a few nuts and bolts and rotation of the top part.

1 Claim, 4 Drawing Sheets

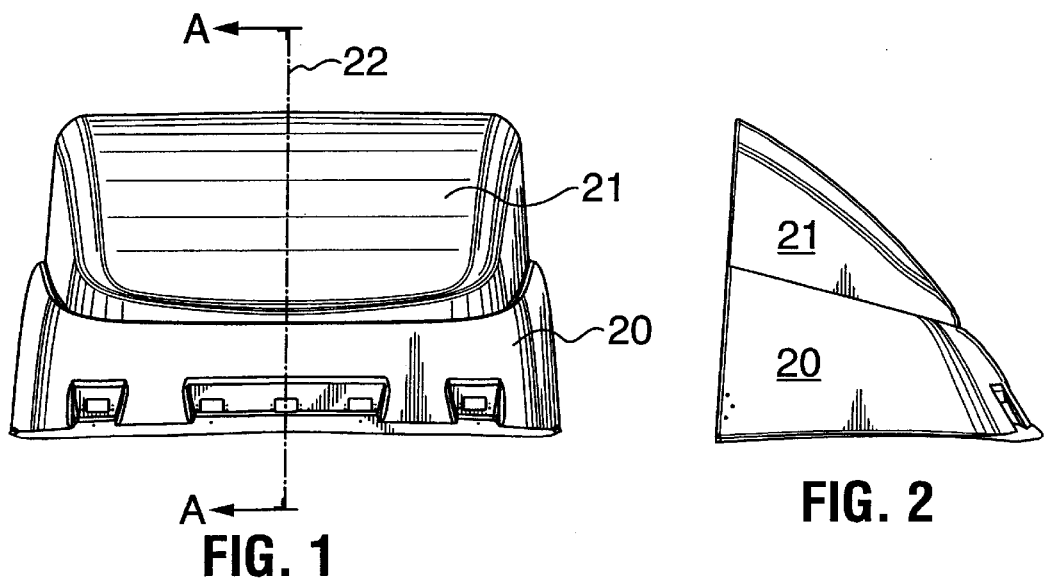
FIG. 1
FIG. 2
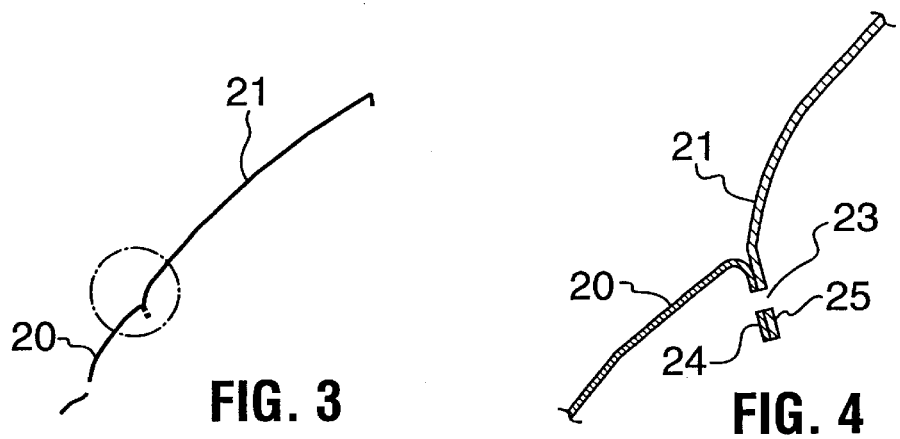
FIG. 3
FIG. 4

TWO-PIECE NESTABLE AIRFAIRING

BACKGROUND OF THE INVENTION

1. Field of the Invention

The present invention relates to airfairings for reducing aerodynamic drag when operatively mounted on trucks and the like. In particular, it relates to a simplified two-piece airfairing which is nestable when not in the operative position, as for example during shipping. To change from the nested to the operative position only requires manipulation of a few nuts and bolts and rotation of the top part.

2. Prior Art

The following United States patents are known:

U.S. Pat. No. 5,603,549 entitled Nestable Multipiece Truck Cab Roof Fairing Assembly issued Feb. 18, 1997 to David F. Chen and David F. Lewis.

U.S. Pat. No. 5,249,837 entitled Adjustable Height Fairing with Translatable Upper Fairing Member issued Oct. 5, 1993 to Noel Luttrell.

U.S. Pat. No. 5,174,626 entitled Rooftop Drag Reducing Device issued Dec. 29, 1992 to Nathaniel C. Wiley, Jr., and John R. Heath.

U.S. Pat. No. 4,957,322 entitled Aerodynamically Configured Cab Roof Assembly for a Truck issued Sep. 18, 1990 to Huston Marlowe, J. Tao and Virgil Pound.

U.S. Pat. No. 4,919,471 entitled Rooftop Drag Reducing Device for Multi-Truck Shipment when Mounted issued Apr. 24, 1990 to Nathaniel C. Wiley, Jr.

U.S. Pat. No. 4,245,862 entitled Drag Reducer for Land Vehicles issued Jan. 20, 1981 to Frank T. Buckley, Jr.

U.S. Pat. No. Des. 374,418 entitled Air Fairing and Trim Tar Unit issued Oct. 8, 1996 to Timothy A. Griffin.

U.S. Pat. No. Des. 375,925 entitled Air Fairing issued Nov. 26, 1996 to Timothy A. Griffin.

All of the airfairings disclosed in the above patents are more or less more complex than the airfairing of the present invention.

SUMMARY OF THE INVENTION

The present invention provides an airfairing preferably made from glass fibres/polyester resin in two pieces. To change from the operative to the nested position, and vice versa, the top piece, after removing the nuts and bolts, is simply flipped or rotated 180° through its vertical plane of symmetry such that its top edge (in the operative position) becomes its bottom edge (in the nested position), and vice versa when changing from nested to operative position. When using the above preferred materials, an airfairing wall thickness of 0.15 inch is sufficient. Other materials may imply different thicknesses.

An airfairing according to the present invention comprises: a bottom part, shaped in the usual aerodynamically advantageous manner, adapted for being affixed to the roof top of a vehicle such as a truck cab at its bottom edge and having its top, free, edge engaging a compatible bottom edge of a top part, likewise shaped in the usual aerodynamically advantageous manner, when the airfairing is in an operative assembly position; and the said top, free, edge of the bottom part engaging the compatible bottom edge of the top part after the top part has been rotated 180° through its vertical symmetry plane and lowered to put the airfairing in a nested assembly position within the bottom part, wherein the compatible bottom edge of the top part remains contiguous and substantially co-planar with the top, free, edge of the bottom part.

BRIEF DESCRIPTION OF THE DRAWINGS

The preferred embodiments of the present invention will now be described in detail in conjunction with the drawings, in which:

FIG. 1 is a front view of the two-piece airfairing of the present invention in the operative position;

FIG. 2 is a side view of the airfairing shown in FIG. 1;

FIG. 3 is a schematized cross-section along the vertical symmetry-plane A—A shown in FIG. 1;

FIG. 4 is an enlarged view of the detail circled in FIG. 3;

DETAILED DESCRIPTION OF THE PREFERRED EMBODIMENTS

Figure 5:
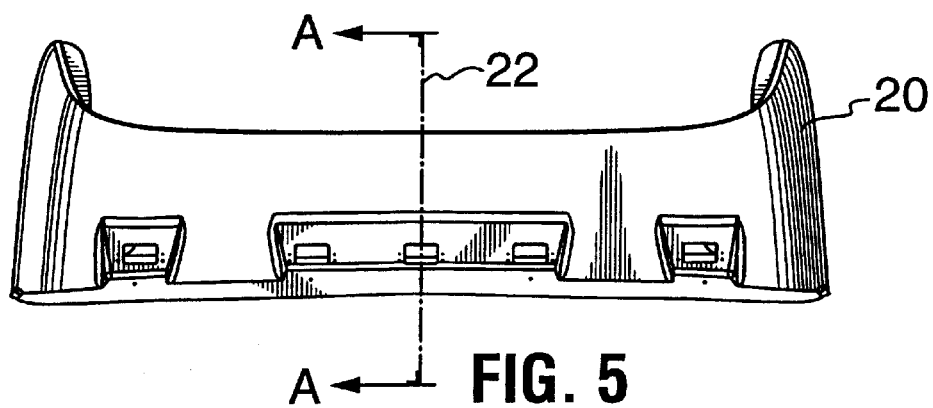
FIG. 5 is a front view of the two-piece airfairing of FIG. 1 but in the nested position.

Referring to FIG. 1 of the drawings, the two-piece airfairing comprises a bottom part 20 and a top part 21 mounted on top of the bottom part 20 when the airfairing is in the operative assembly position. FIG. 2 shows the airfairing of FIG. 1 from the side. FIG. 3 is a schematized cross-sectional view A—A in the vertical symmetry plane of the airfairing indicated by vertical line 22. An enlargement of the circled portion of FIG. 3 is shown in FIG. 4, which explains how the bottom and top parts 20 and 21 are joined together, where a nut and bolt (not shown) cooperate through middle hole 23. There are, of course other coincident holes in the compatible flanges 24 and 25 of the bottom and top parts 20 and 21, respectively, which by means of a few nuts and bolts keep them securely engaged along the flanges.

Figure 6:
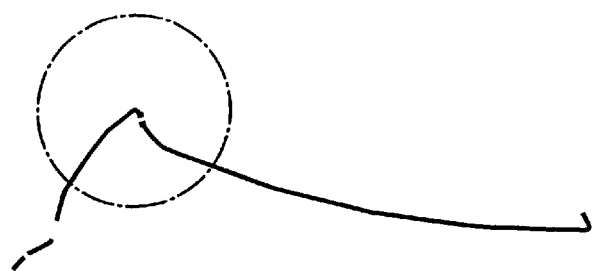
FIG. 6 is a schematized cross-section along the vertical symmetry-plane A—A shown in FIG. 5.
Figure 7:
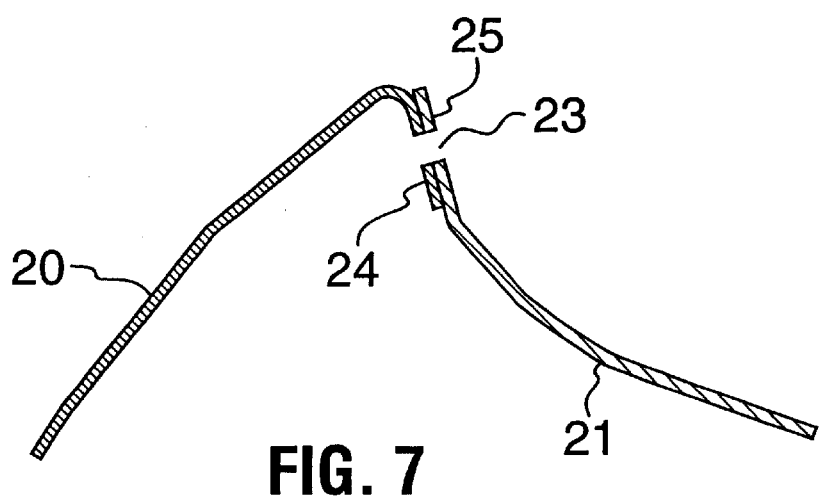
FIG. 7 is an enlarged view of the detail circled in FIG. 6.

FIGS. 5, 6 and 7, are similar to FIGS. 1, 3 and 4, but show the airfairing assembly in the nested position. As may be clearly seen in FIGS. 6 and 7, the top part 21 has been rotated 180° through the vertical symmetry-plane indicated by vertical line 22 and lowered to nest within the bottom part 20, with the flanges 24 and 25 in contact as shown in FIG. 7. The middle hole 23, which goes through both flanges, is still in alignment.

Figure 8:
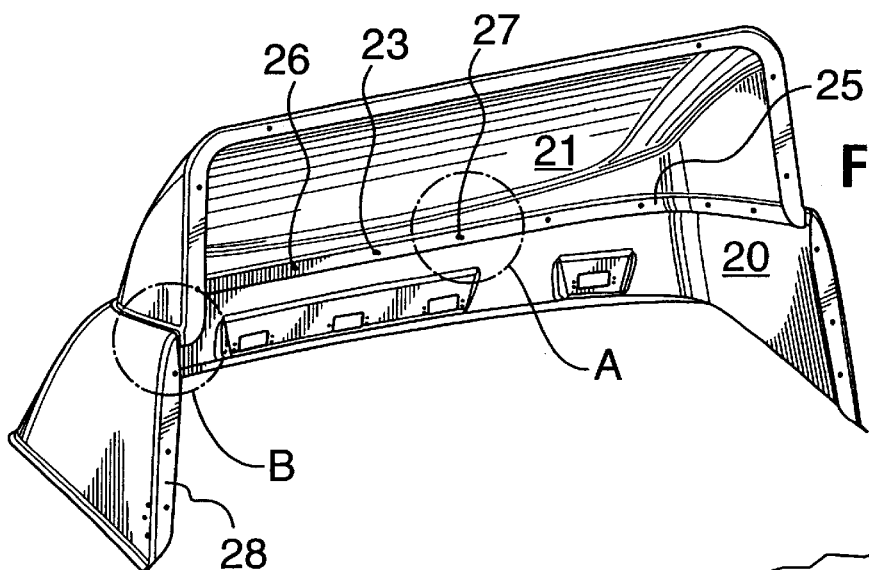
FIG. 8 is a perspective rear view of the airfairing shown in FIG. 1.
Figure 9:
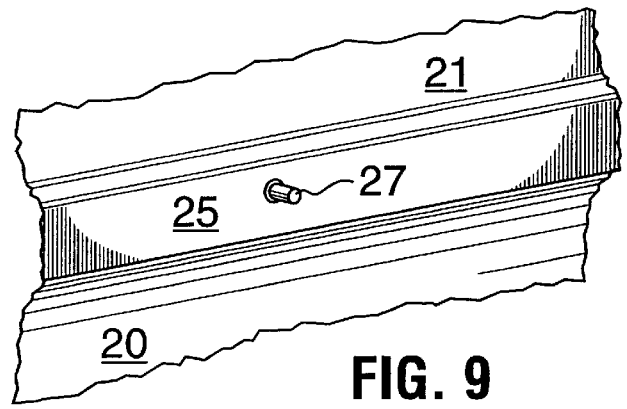
FIG. 9 shows an enlarged view of a guiding pin or stud circled A in FIG. 8.
Figure 10:
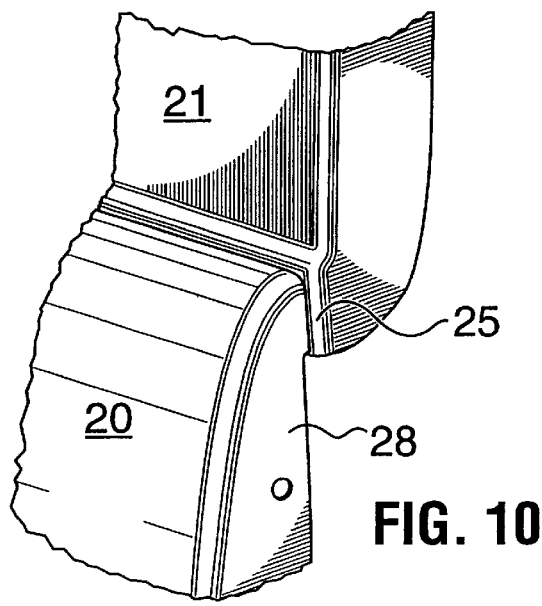
FIG. 10 shows an enlarged view of the detail circled B in FIG. 8.

Referring now to FIG. 8, it shows the airfairing in perspective view from the rear in the operative assembly position. In order to facilitate installation from nested to operative assembly positions, and vice versa, two aligning studs or guiding pins 26 and 27, which may be threaded to receive nuts, are provided in the flange 24 and cooperate with aligning holes in the flange 25. Because the pins 26 and 27 are symmetrically arranged on either side of the hole 23 (i.e. on either side of the plane 22) they align with the cooperating holes in the flange 25 in both operative and nested positions. The detail of the aligning pin 27 (circled A) is shown enlarged in FIG. 9. FIG. 10 shows the enlarged detail B in FIG. 8. The vertical flange 28 may be used to affix fairing extensions (not shown) where desired; but such fairing extensions could also be integral with the bottom and top parts 20 and 21.

Figure 11:
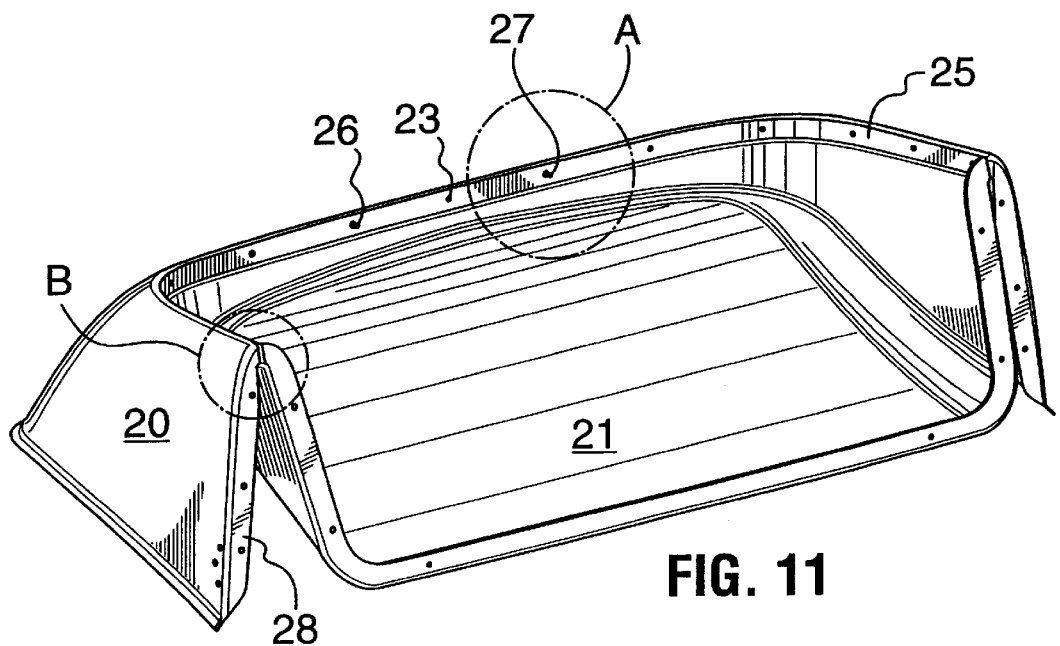
FIG. 11 is a perspective rear view of the airfairing shown in FIG. 5.
Figure 12:
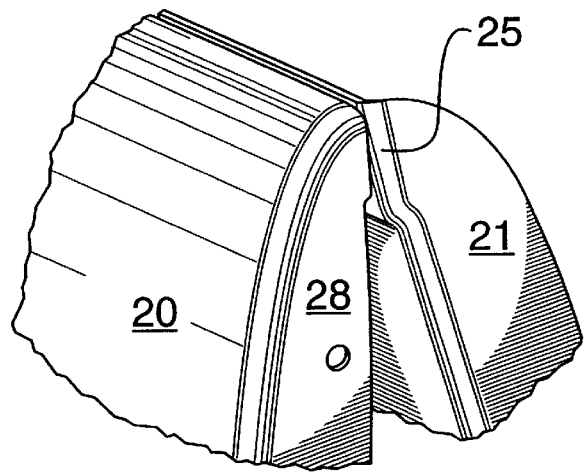
FIG. 12 shows an enlarged view of the detail circled B in FIG. 11.

FIGS. 11 and 12 are similar to FIGS. 8 and 10, but show the airfairing in the nested assembly position in perspective, corresponding to FIGS. 5, 6 and 7. The stud 27 now goes through the hole that was on the other side of the middle hole 23 while in the operative assembly position. The two flanges remain still contiguous and substantially in the same plane as in the raised, operative, position. The detail circled 8 is shown in FIG. 12, which is the nested counterpart to FIG. 10.

The airfairing is delivered in the nested position as shown in FIG. 11. It is likely sufficient that only two sets of bolts and nuts be used to secure the top part 21 in the nested position, one set near the rear ends of the flanges 24 and 25. If the studs 26 and 27 are threaded, cooperating nuts could be used, or a nut and bolt set could be used through the central hole 23. All that is then needed to assemble the airfairing into the operative position are a few more sets of nuts and bolts to securely engage the two flanges by means of the holes distributed therealong as shown in FIG. 8. Thus, the hardware required is minimal and easily replaced.

Finally, the apertures along the bottom edge of the bottom part 20 shown in FIGS. 1, 5 and 8 are for the usual truck-cab lights to show through, but, of course, are not required where there are no cab lights.

What is claimed is:

1. A two-piece nestable airfairing comprising: a bottom part having a bottom edge, the bottom part being adapted for being affixed to the roof top of a vehicle at the bottom edge and having a top, free, edge engaging a compatible bottom edge of a top part when the airfairing is in an operative assembly position; the top part having a vertical symmetry plane, the said top, free, edge of the bottom part engaging the compatible bottom edge of the top part after the top part has been rotated 180° through the vertical symmetry plane thereof and lowered to put the airfairing in a nested assembly position within the bottom part, wherein, in the nested assembly position, the compatible bottom edge of the top part is contiguous and substantially co-planar with the top, free, edge of the bottom part.

* * * * *